3,392,713
FLUID ADMISSION FOR TWO-STROKE ENGINES
Hanns Hilber, Hochberg (Neckar), and Engelbert Sczygiol, Dornhan, Germany, assignors to Kreidler's Metall & Drahtwerke, Stuttgart-Zuffenhausen, Germany
Filed Mar. 16, 1967, Ser. No. 623,650
Claims priority, application Germany, Mar. 22, 1966,
K 58,792
7 Claims. (Cl. 123—73)

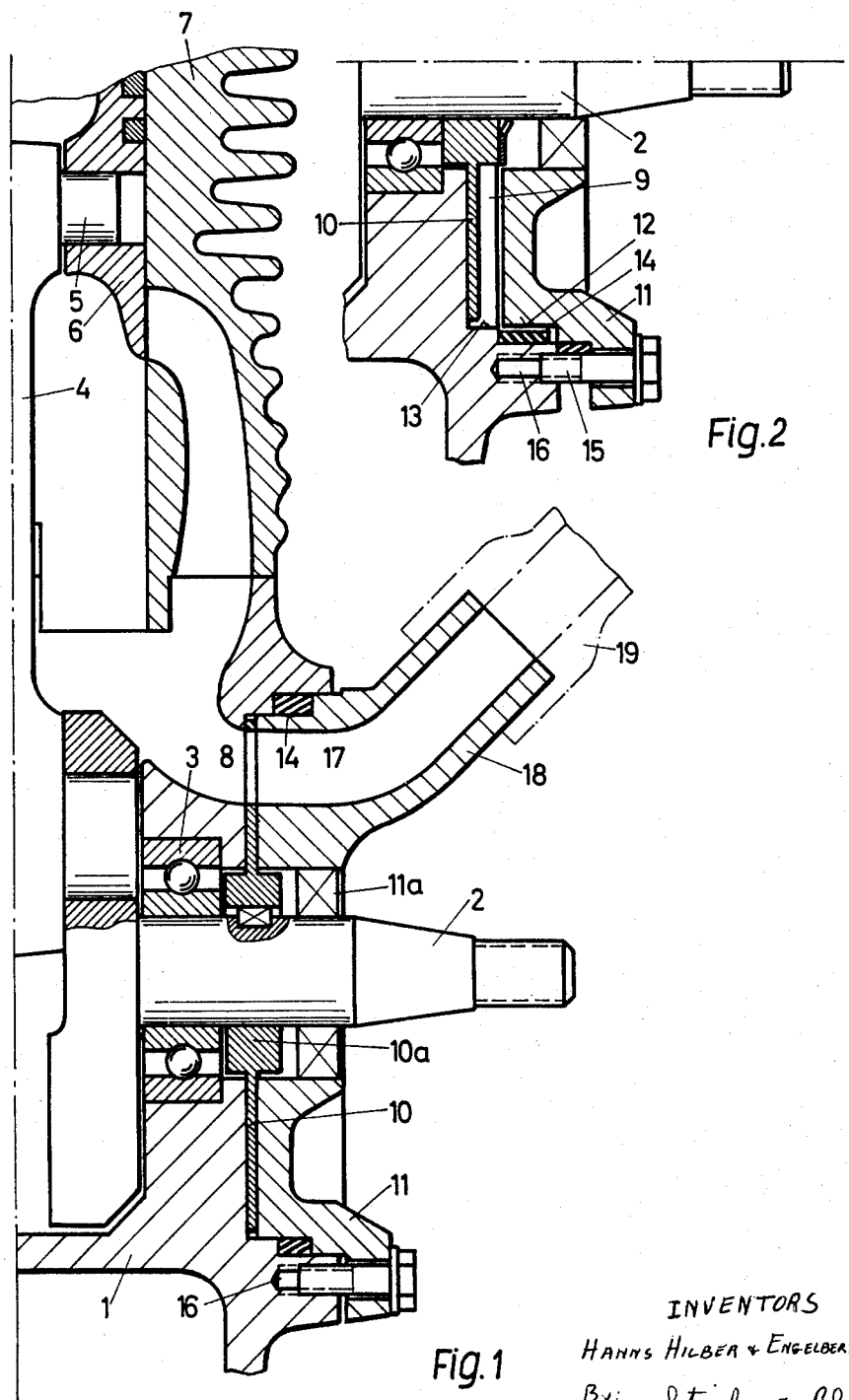

ABSTRACT OF THE DISCLOSURE

A two-stroke engine having a crankcase and a rotary crankshaft provided with an elongated end portion extending to the exterior of the crankcase. A valve chamber surrounds the end portion of the crankshaft and communicates with the interior of the crankcase while a rotary valve means is situated in the valve chamber for controlling the flow of fluid into the chankcase. The rotary valve means is connected to the end portion of the crankshaft for rotation therewith while being axially movable therealong, and a cover means covers the valve chamber and is formed with an inlet passage through which fluid flows in a manner controlled by the rotary valve means to the interior of the crankcase. The valve chamber has an inner end surface and the cover means also has an inner end surface, and it is between these end surfaces that the rotary valve means is situated. The cover means surrounds the end portion of the crankshaft with this end portion passing through the cover means. An adjusting means coacts with the cover means for adjusting the position of the latter along the axis of the crankshaft so as to eliminate play between the rotary valve means and the above end surfaces. An elastic sealing ring is compressed between the valve chamber and the cover means for yieldably opposing movement of the cover means, during adjustment thereof by the adjusting means, in a direction which displaces the cover means towards the rotary valve means.

Background of the invention

The present invention relates to two-stroke engines.
In particular, the present invention relates to structure for admitting fluid, namely a combustible mixture, into the crankcase of the engine.

Two-stroke engines are known where a rotary valve controls the admission of fluid into the crankcase, such engines having, for example, a rotary valve in the form of a circular disc which has a central hub fixed to the crankshaft for rotary movement therewith. It is also known to situate such a rotary valve in a relatively small valve chamber in which the valve rotates and which adjoins the interior of the crankcase, this valve chamber being closed by a cover which forms an end wall of the chamber and which at the same time is provided with an inlet passage through which the fluid flows to the interior of the crankcase in a manner controlled by the rotary valve. This cover for the valve chamber surrounds the crankshaft so that the latter passes through the cover, and of course the cover closes off the valve chamber from the exterior.

One of the problems which has not yet been solved in a satisfactory manner with a structure of this type resides in the achievement by the rotary valve member of closing of the inlet passage into the interior of the crankcase by providing an effective gas-tight closure for a predetermined closing time during each revolution of the rotary valve member between the interior of the crankcase and the inlet passage. In order to solve this problem it has already been proposed to provide ring-shaped sealing elements which are concentrically arranged with respect to the inlet passage for the fluid and which are urged by a spring against the exterior surface of the rotary valve member. Inevitably with this construction the sealing element become worn away and also the exterior surface of the rotary valve becomes worn away, so that this solution to the problem only provides a source of trouble.

A later proposal for solving this problem involves making the rotary valve member so thin that it yields to the increase in the pressure in the interior of the crankcase, in a manner similar to a diaphragm, so as to provide a tight closure of the inlet. At certain speeds of revolution, however, such a thin rotary valve member is inclined to vibrate and flutter, resulting in the formation of undesirable noise and finally also in wearing away of the structure.

A better solution to the problem resides in achieving a perfect seal by maintaining the play between the rotary valve member and the end surfaces of the valve chamber as small as possible, and primarily by providing for rotary movement of the valve member with respect to the outer end wall of the chamber in a so-to-speak play-free manner. Such a construction requires initially a particularly accurate manufacture of the components as well as a careful assembly and fitting together of the components, requiring in certain cases working of the components during their assembly. The working costs involved in these latter procedures are, however, only acceptable in the individual manufacture of engines for sport cars, or in a case where a relatively small number of such high-powered engines are manufactured.

Summary of the invention

It is a primary object of the present invention to provide two-stroke engines which are capable of being mass-produced in an economical manner with rotary valve controls of the above-discussed type, while avoiding the drawbacks of the previously known solutions to the problem.

In particular, it is an object of the invention to provide a construction which will enable the rotary valve to rotate in the valve chamber without any play, so that a perfect closure of the intake manifold, where it communicates with the interior of the crankcase, can be achieved for a predetermined part of each revolution of the crankshaft.

Furthermore, it is an object of the invention to provide a construction which can be adjusted for eliminating play of the rotary valve member.

Thus, in accordance with the invention the valve chamber is provided with a cover which is capable of being adjusted along the axis of the crankshaft for the best-possible elimination of play between the rotary valve member and the inner end surfaces of the valve chamber.

The valve chamber is defined by a wall means which is integral with the crankcase and which has an inner cylindrical surface surrounding the crankshaft coaxially, and the cover means has an outer cylindrical surface slidably engaging this inner cylindrical surface of the valve chamber with the crankshaft having an end portion extending through the valve chamber and through the cover means. An adjusting means is provided for adjusting the cover means along the crankshaft so as to eliminate play between an inner rotary valve member which is in the valve chamber and the end surfaces of the valve chamber, and an elastic sealing ring is compressed by the cover means and yieldably and resiliently opposes movement thereof toward the valve member during adjustment of the position of the cover means. The adjusting means which adjusts the position of the cover means to eliminate play between the rotary valve member and the inner end surfaces of the valve chamber may take the form of rotary bolts which pass through openings of the cover means and are received in tapped bores of the crankcase.

An outer housing part is fixed to the exterior of the crankcase, as by being connected thereto by suitable screws, and this outer housing part may define with the crankcase an enclosure for the cover means of the valve chamber, this outer housing part being formed with a passage which is an extension of the passage in the cover means through which the fluid flows during entry into the crankcase. Thus, the passage in the cover means and the passage in the outer housing part respectively have ends which are adjacent each other, and these ends are surrounded by an elastic sealing ring which is compressed between the cover means and the outer housing part so as to bridge the space between these passages and so as to compensate for lack of manufacturing accuracy and for adjustment of the cover means. The passage in the outer housing part may be curved so as to form an elbow, for example.

*Brief description of the drawings*

The invention is illustrated by way of example in the accompanying drawings which form part of this application and in which:

FIG. 1 is a fragmentary sectional elevation, taken in a plane which includes the axis of the crankshaft and showing one possible embodiment of a structure according to the invention;

FIG. 2 is a fragmentary sectional view of part of the structure of FIG. 1 showing the components before they are fully assembled into the condition of FIG. 1.

*Description of preferred embodiments*

Figure 3:
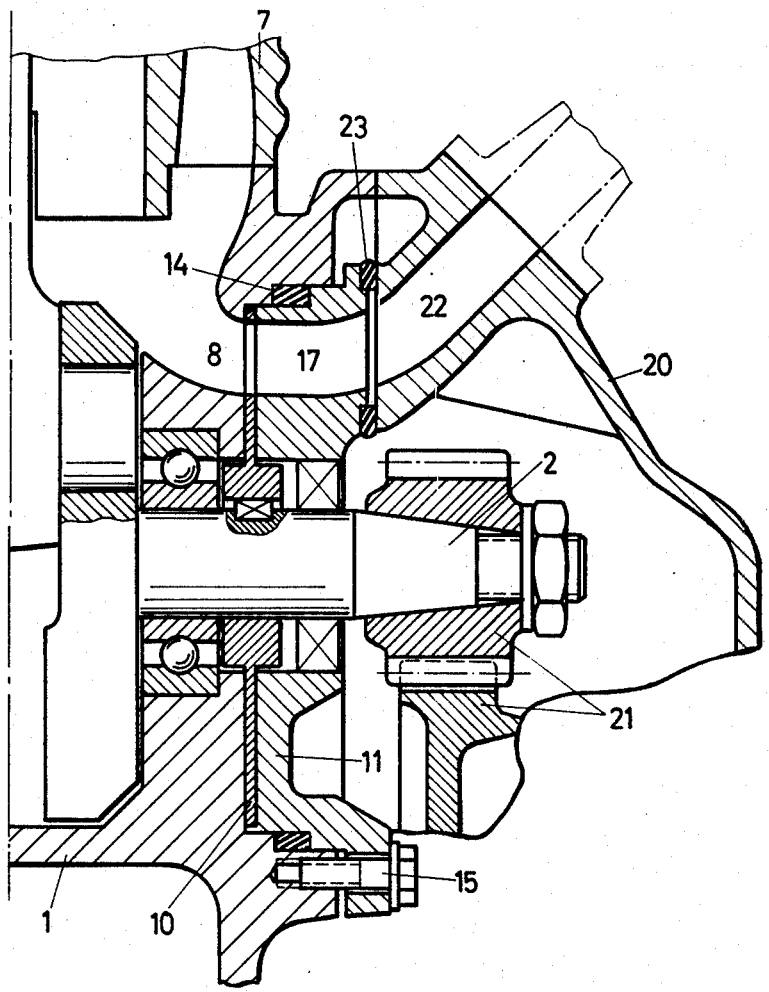
FIG. 3 is a sectional elevation, also including the axis of the crankshaft, and showing another embodiment of a structure of the invention.

Referring to FIG. 1, there is fragmentarily illustrated therein the crankcase 1 of a two-stroke engine. A rotary crankshaft 2 is situated in the crankcase 1 and has the elongated end portion visible in FIG. 1 extending to the exterior of the crankcase. The end of the crankshaft which is visible in FIG. 1 is supported for rotary movement by a ball bearing 3 carried by the crankcase 1. FIG. 1 also shows part of a connecting rod 4 which connects the crankshaft to the piston 6 by way of a wrist pin 5, and the piston 6 reciprocates in the cylinder 7 which is fragmentarily illustrated in FIG. 1. In order to admit a fluid in the form of a fresh combustible mixture into the interior of the crankcase, the crankcase 1 is formed with an inlet opening 8. This inlet opening 8 forms part of a wall means which is integral with the crankcase 1 and which defines the valve chamber 9 (FIG. 2), this valve chamber 9 being of a relatively small size and having a circular cylindrical configuration with the elongated end portion of the crankshaft 2 passing coaxially through the valve chamber 9 of the wall means which is integral with the crankcase 1 so that the valve chamber 9 is situated closely adjacent thereto. The rotary valve means 10 is situated in the chamber 9 for rotary movement therein, and this rotary valve means 10 is in the form of a flat circular plate or disc which is situated in a plane normal to the axis of the crankshaft with the end portion of the latter passing also coaxially through the rotary valve means 10.

A connecting means connects the rotary valve means 10 to the crankshaft for rotary movement therewith while freeing the rotary valve means for axial movement along the crankshaft, and as is apparent from FIG. 1 this connecting means includes the central annular hub portion 10a of the valve means 10 which is slidably keyed onto the crankshaft for rotation therewith while being axially movable with respect thereto. In addition to being axially shiftable along the crankshaft, it may be desirable in some cases to provide a structure which is capable of adjustably fixing the valve means along the axis of the crankshaft.

A cover means 11 closes the chamber 9, and this cover means 11 also coaxially surrounds the end portion of the crankshaft which extends to the exterior of the crankcase, with this latter end portion passing centrally through the cover means 11. As is shown in FIG. 2, the cover means 11 has an outer cylindrical surface 12 coaxially surrounding the crankshaft while the wall means which defines the chamber 9 has an inner cylindrical surface 13 also coaxially surrounding the crankshaft and slidably engaged by and surrounding the cylindrical surface 12 of the cover means 11, when the parts are assembled, as is apparent from a comparison of FIGS. 1 and 2. Thus, the surface 13 serves to guide the cover means 11 by slidably engaging the surface 12 of the latter.

The wall means which defines the chamber 9 has extending radially beyond the surface 13 of the chamber an outer annular surface which is directed toward an outwardly directed flange of the cover means 11 which projects radially beyond the cylindrical surface 12 thereof, and this annular surface of the wall means and the flange of the cover means 11 define between themselves a groove in which an elastic sealing ring 14 is situated.

An adjusting means is provided for adjusting the position of the cover means 11 by advancing the latter toward the rotary valve means 10, and in the illustrated example this adjusting means includes rotary screws or bolts which pass through openings of the cover means and are received in tapped bores 16 of the crankcase or wall means which is integral therewith. Thus, by threading the bolts 15 into the threaded bores 16 the cover means 11 will be advanced toward the rotary valve means to an adjusted position in which the cover means 11 will be retained.

At the region where the elongated end portion of the crankshaft 2 passes through the cover means 11, a suitable sealing gland 11a is provided.

The cover means 11 is formed with an inlet passage 17 through which the combustible fluid can enter into the crankcase, this passage 17 forming an extension of the opening 8 with the rotary valve means 10 turning between the opening 8 and the passage 17 and being itself formed with an opening which during a part of each revolution coincides with the opening 8 and the passage 17 for admitting the fluid into the crankcase, while during another part of each revolution the rotary valve means 10 closes the passage 17 off from communication with the opening 8 so that fluid cannot enter into the crankcase. This passage 17 of the cover means is formed by the hollow interior of a tubular extension 18 of the cover means, and a suction conduit 19 communicates with the tubular extension 18, as indicated in dot-dash lines in FIG. 1, so that in this way the intake manifold will communicate with the interior of the crankcase in a manner controlled by the rotary valve means 10. The suction conduit 19 is connected to the unillustrated carburetor of the engine.

As is apparent from FIGS. 1 and 2, by turning the screws 15 of the adjusting means, the cover means 11 can be adjusted in opposition to the action of the elastic sealing ring 14 for eliminating play between the longitudinally shiftable rotary valve means 10 and the end surfaces between which this rotary valve means rotates, these end surfaces respectively being the inner end surface of the chamber 9 which is slidably engaged by the inner surface of the valve 10 and the inner end surface of the cover means 11 which is slidably engaged by the outer surface of the valve 10. The adjustment which can be provided by way of the adjusting means 15 is capable of eliminating play between the rotary valve means 10 and these end surfaces between which it is situated in a highly accurate manner so that this play is reduced to an absolute minimum. Thus, it is possible in this way to guide the rotary valve means 10 for rotary movement in the valve chamber 9 in a manner which is so-to-speak free of play, without at the same time requiring in the manufacture of the engine the exercise of care which goes beyond that required for normal manufacturing accuracy.

In the case where the crankcase 1 is made of a material which is sensitive to wear, such as, for example, magnesium or electron (an alloy containing about 90% magnesium, 5% aluminum, and a little zinc, manganese or copper), it is preferred to situate the rotary valve means 10 on the crankshaft 2 in such a way that there is indeed a certain clearance or play between the rotary valve means 10 and the inner end surface of the valve chamber 9 which is nearer to the hollow interior of the crankcase. This is brought about by fixing the axial position of the rotary valve means on the crankshaft with any suitable structure which is not shown in the drawing, so that the rotary valve means does not have any frictional engagement with the crankcase On the other hand, the cover means 11 is adjusted in this case so that there is no play or clearance between the cover means and the rotary valve means. Thus, the rotary valve means will in this case have a rotary slidable engagement with the inner end surface of the cover means 11 to provide the closure of the inlet passage during a predetermined part of each revolution of the rotary valve means. In order to minimize the wear between the rotary valve means and the cover means 11, the inner end surface of the latter which is slidably engaged by the rotary valve means can be hardened as by being chromed.

The embodiment of the invention which is illustrated in FIG. 3 differs from that of FIG. 1 only in that the cover means 11 is situated in an enclosure which is defined by an outer housing part 20 and the crankcase 1 to which this outer housing part 20 is fixed as by suitable screws. This enclosure which is defined between the outer housing part 20 and the crankcase is used in a known manner to accommodate other components such as, for example, the primary drive 21 for a step-down change-gear transmission which is driven by the engine. Thus, this outer housing part 20 is to be considered as fixedly screwed not only to the crankcase 1 but also to additional unillustrated housing components.

This outer housing part 20 is formed with a suction inlet passage 22 having the configuration of an elbow, for example, and forming an extension of the passage 17 of the cover means 11. Thus, the passages 17 and 22 respectively have ends which are closely adjacent to each other, and the gap between these ends is surrounded by an elastic sealing ring 23 which bridges this gap and which is compressed between the cover means 11 and the housing part 20. Thus, this sealing ring 23 will compensate for variations in the size of this gap during adjustment of the cover means 11 as well as for any manufacturing inaccuracies. The provision of the outer housing part 20 to form an enclosure for the cover means 11 has the particular advantage of preventing unauthorized access to the adjusting means 15.

It is of course to be understood that the invention can also be used with equal advantage with a more or less symmetrically constructed engine, such as one which is provided with a pair of intake manifolds and a pair of rotary valves.

What is claimed is:

1. In a two-stroke engine, a crankcase, a rotary crankshaft situated in said crankcase and having an elongated end portion extending to the exterior of said crankcase, wall means situated in the region of said end portion of said crankshaft and in the region of said crankcase for defining a valve chamber communicating with the interior of said crankcase and having an end surface adjacent said crankcase, a rotary valve means situated in said chamber for rotary movement therein for controlling the flow of fluid into said crankcase, connecting means connecting said rotary valve means to said end portion of said crankshaft for rotation therewith but for axial movement therealong, cover means situated at a side of said rotary valve means which is directed away from said end surface of said chamber for covering said chamber, said cover means being formed with an inlet passage through which fluid flows during movement into said crankcase in a manner controlled by said rotary valve means, said cover means having an inner end surface directed toward said rotary valve means so that said latter end surface and said end surface of said chamber form a pair of end surfaces between which said rotary valve means is situated, and adjusting means coacting with said cover means for adjusting the position thereof along the axis of said crankshaft for eliminating play between said rotary valve means and said pair of end surfaces.

2. The combination of claim 1 and wherein said wall means forms part of said crankcase and includes an inner cylindrical surface coaxially surrounding said end portion of said crankshaft, said cover means surrounding said crankshaft and having an outer cylindrical surface surrounded by and slidably engaging said inner cylindrical surface of said wall means.

3. The combination of claim 2 and wherein an elastic sealing ring surrounds said crankshaft and is compressed between said wall means and said cover means for resiliently and yieldably opposing adjustable movement of said cover means by said adjusting means in a direction which advances said inner end surface of said cover means toward said rotary valve means.

4. The combination of claim 3 and wherein said adjusting means includes rotary threaded members which are turnable for adjusting said cover means.

5. The combination of claim 4 and wherein said rotary threaded members are in the form of bolts, said cover means being formed with openings through which said bolts extend in a direction parallel to the axis of said crankshaft, and said crankcase being formed with threaded openings which respectively receive said bolts with the latter threadedly engaging said crankcase in said threaded openings thereof, respectively, so that turning of said bolts will adjust said cover means.

6. The combination of claim 1 and wherein an outer housing part is fixed to said crankcase and defines therewith an enclosure in which said cover means is situated, said outer housing part being formed with a passage which is an extension of said passage of said cover means, so that said passage of said outer housing part has an end situated adjacent an end of said passage of said cover means, and a sealing ring of elastic material surrounding said ends of said passages and compressed between said cover mean and said housing part.

7. The combination of claim 1 and wherein said wall means forms an integral part of said crankcase and said chamber which is defined by said wall means coaxially surrounding said end portion of said crankshaft, said wall means having an inner cylindrical surface defining the outer limit of said chamber and coaxially surrounding said end portion of said crankshaft, said rotary valve means being in the form of a flat plate having an inner surface directed toward said end surface of said chamber and slidably engaging said end surface of said chamber, said plate having an outer surface directed toward and slidably engaging said end surface of said cover means, and said cover means having an outer cylindrical surface surrounded by and slidably engaging said cylindrical surface of said wall means, said cover means also surrounding said crankshaft and said wall means being formed with an opening through which said chamber communicates with the interior of said crankcase, said passage of said cover means forming a continuation of said opening of said wall means and said rotary valve means being formed with an opening which coincides with said passage of said cover means and said opening of said wall means during at least part of each revolution of said rotary valve means with said crankshaft, said cover means having an outer flange projecting radially beyond said outer cylindrical surface thereof and said wall means having an annular surface surrounding said cylindrical surface of said cover means and defining with said flange of said cover means a groove whose width is adjusted during adjustment of said cover means along the axis of said crankshaft, and an elastic sealing ring situated within said groove and compressed between said annular surface of said wall means and said flange of said cover means for yieldably opposing adjustment of the latter by said adjusting means in a direction which displaces said end surface of said cover means toward said rotary valve means.

References Cited

UNITED STATES PATENTS

| | | |
|---|---|---|
| 1,173,815 | 2/1916 | Latta. |
| 2,469,117 | 5/1949 | Kiekhaefer. |

FOREIGN PATENTS

| | | |
|---|---|---|
| 86,459 | 6/1936 | Sweden. |
| 948,019 | 8/1956 | Germany. |
| 1,045,096 | 6/1953 | France. |

WENDELL E. BURNS, *Primary Examiner.*